Aug. 23, 1966  A. E. SNOWDON  3,268,747
LINEAR ELECTRIC MOTOR
Filed Feb. 28, 1964  2 Sheets-Sheet 2
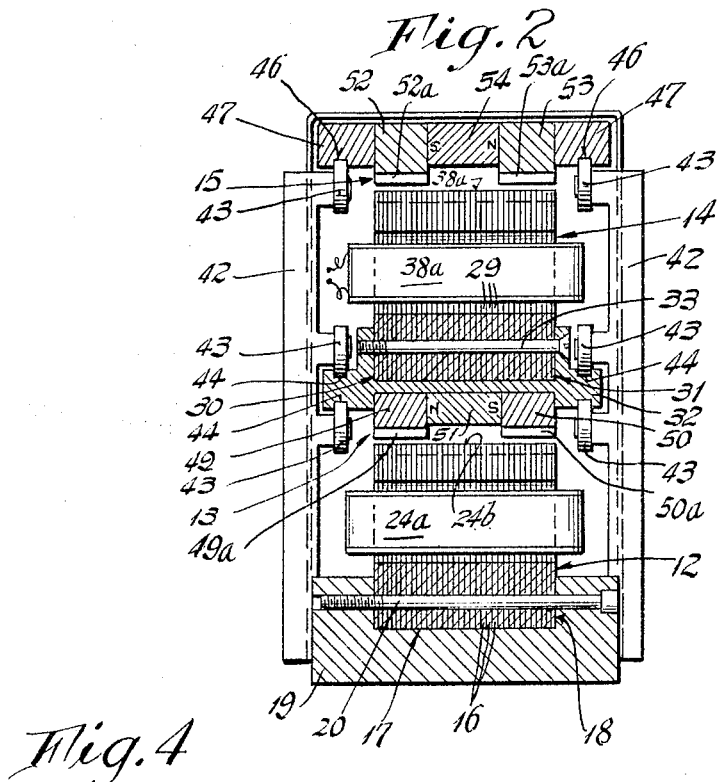
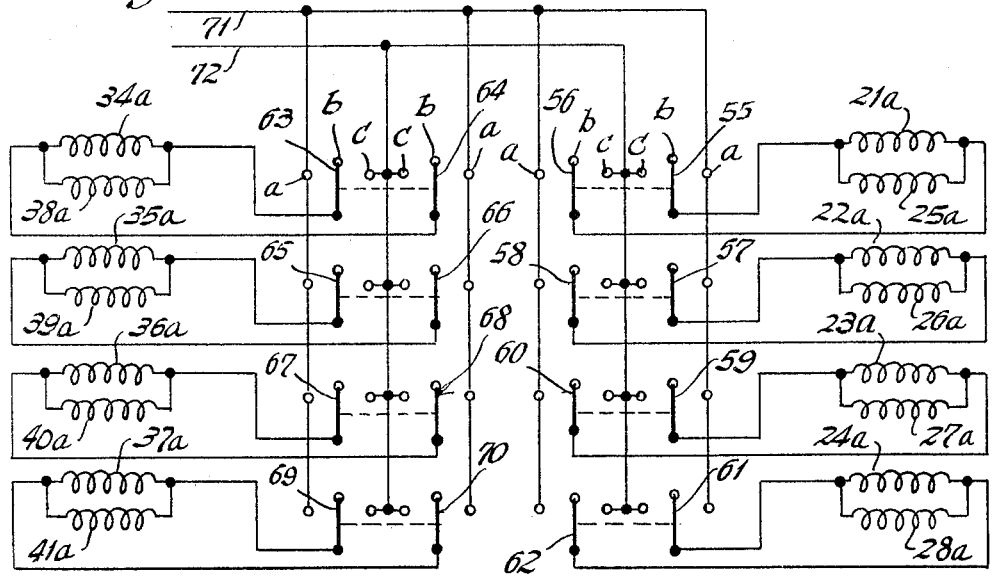
INVENTOR.
Arthur E. Snowdon
BY
Johnson and Kline
ATTORNEYS United States Patent Office 3,268,747
Patented August 23, 1966

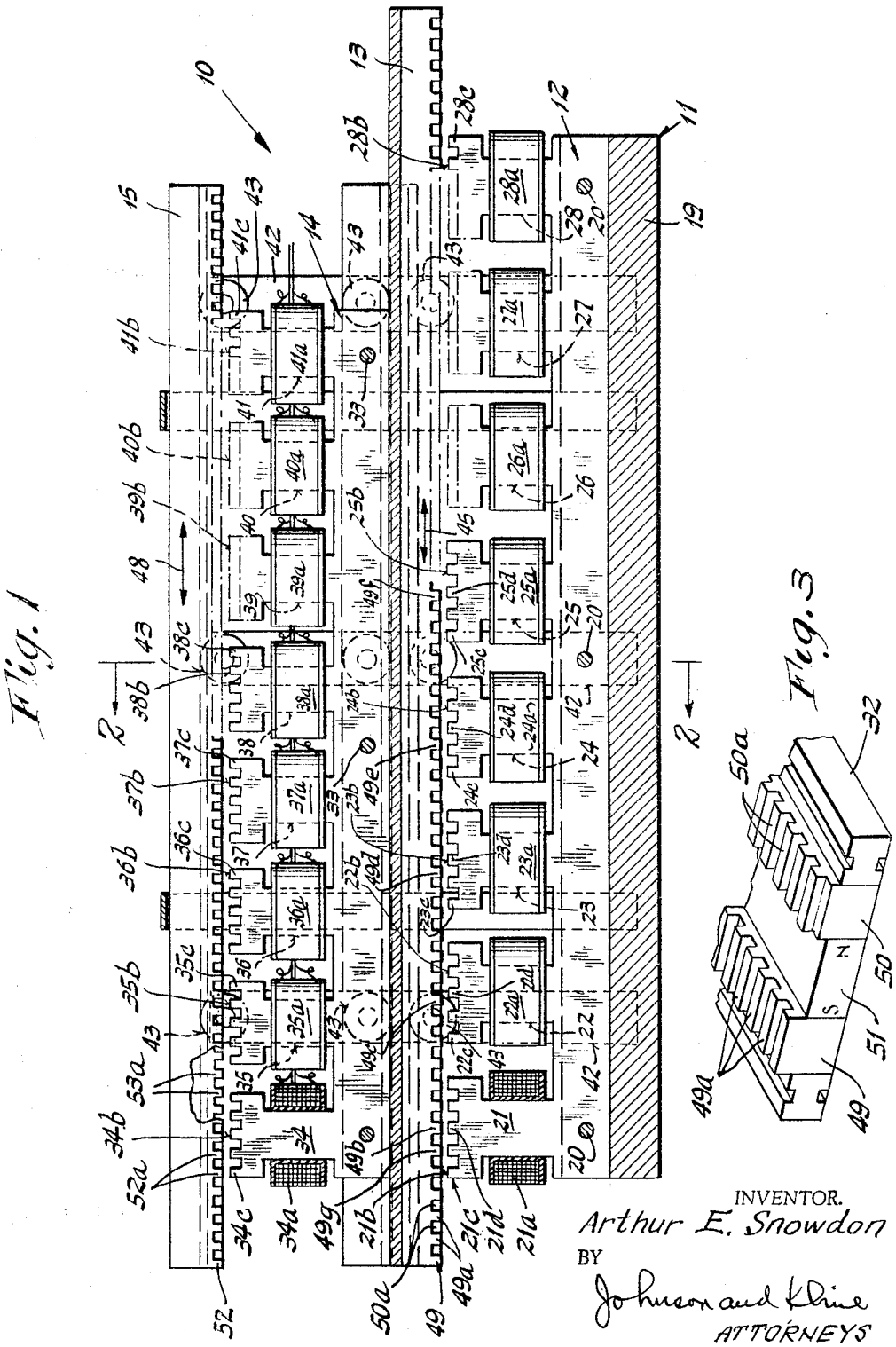

3,268,747
LINEAR ELECTRIC MOTOR
Arthur E. Snowdon, Bristol, Conn., assignor to The Superior Electric Company, Bristol, Conn., a corporation of Connecticut
Filed Feb. 28, 1964, Ser. No. 348,196
9 Claims. (Cl. 310—13)

The present invention relates to an electric motor that produces linear movement and more particularly to such a motor in which the movement produced occurs in steps of precise length.

In United States patent applications Serial Nos. 340,232 and 340,233 both filed on January 27, 1964 by Gustav O. Fredrickson and Elmer W. Madsen respectively and both entitled Reciprocating Electric Motor and assigned to the assignee of the present application, there are disclosed electric motors that produce linear movement in steps of precise length. Each of these motors includes a plunger having teeth formed thereon and a stator means formed of a plurality of pole pieces that are also toothed and differentially displaced along the path of movement of the plunger a distance correlated to the tooth pitch of the plunger teeth. While such motors have been found satisfactory, however, as they only produce steps having a length that is a fraction of the tooth pitch of the plunger teeth and as the smallness of the tooth pitch is restricted by the practicalities of mechanical and magnetic factors, the length of the smallest precise steps is accordingly restricted.

It is accordingly an object of the present invention to provide a reciprocating electric motor that produces a linear step which is smaller in length than has heretofore been capable of being accomplished.

Another object of the present invention is to provide a reciprocating electric motor in which the length of each step is correlated to the algebraic sum that exists between two tooth pitches of different lengths.

A further object of the present invention is to provide an electric motor of the above type which achieves the above-recited objects but yet is relatively economical to manufacture, durable in use and composed of few parts.

In carrying out the present invention the reciprocating motor hereinafter disclosed includes a plunger and a stator means with the stator means being formed into a plurality of pole pieces. The cooperating surfaces of the plunger and pole pieces are each provided with teeth extending transversely of the path and the plunger is mounted for movement along a linear path with respect to the stator means. The pole pieces of the stator means are disposed along the path with the pole pieces being differentially spaced from adjacent pole pieces by a distance that is correlated to the tooth pitch of the plunger. With this structure, proper magnetization of the pole pieces effects a movement of the plunger that is a fraction of the tooth pitch of the plunger and in the hereinafter disclosed embodiment as there are four main pole pieces, the movement or incremental step may be equal to either ¼ or ⅛ of the plunger tooth pitch for each change in magnetization of the pole pieces.

In order to achieve the above-recited objects, the plunger has mounted thereon another or second stator means similar to the above-recited stator means and hence it moves with the first-mentioned plunger with respect to the first-mentioned stator means. For cooperation with the second stator means there is provided another or second plunger which is mounted for reciprocating movement with respect to the second stator means and also with respect to the first plunger and first stator means. The second plunger and the second stator means are each provided with toothed surfaces in the manner similar to the first and hence selected magnetization of the pole pieces of the second stator means will effect an incremental movement equal to either ¼ or ⅛ of the tooth pitch of the second plunger with respect to its stator means for each change in magnetization of the pole pieces.

In utilizing the above structure, the present invention provides for having the tooth pitch of the first plunger different than the tooth pitch of the second plunger. In this manner, the movement derived from the second plunger with respect to the first stator means and which constitutes the output of the electric motor is the algebraic sum of the movements of the first and second plungers. To achieve a small incremental movement of the second plunger with respect to the first, the plunger tooth pitches are made to have only a small difference therebetween and the first plunger is moved in one linear direction and the second plunger is moved in the same linear path but in the opposite direction. The total movement of the second plunger with respect to the first stator is thus the difference between the two movements. It will be appreciated of course that if both plungers are moved in the same direction along the same linear path that the movement will be the addition of the two individual movements. Moreover, as will hereinafter be more specifically disclosed, if desired one plunger may be made to move a fraction such as ¼ or ⅛ of its tooth pitch per change in magnetization in either direction as may the other plunger and hence by controlling the magnetization of the windings, eight different lengths of movement of the second plunger or output movements of the electric motor may be achieved.

Other features and advantages will hereinafter appear.

In the drawing:

FIGURE 1 is a longitudinal elevation substantially in section of the reciprocating electric motor of the present invention.

FIG. 2 is a section taken on the line 2—2 of FIG. 1.

FIG. 3 is a perspective detail of a surface of a plunger.

FIG. 4 is an electrical schematic diagram of a control circuit which may be utilized with the motor of the present invention to provide selected changes in magnetization thereof.

Referring to FIGS. 1 and 2, the motor is generally indicated by the reference numeral 10 and includes a frame 11 which carries a first stator means 12 that coacts with a first plunger 13. Mounted on the first plunger for movement therewith is a second stator means 14 which cooperates with a second plunger 15.

The first stator means 12 is formed of a plurality of laminations 16 formed from thin sheets of magnetic iron to have the shape shown with the laminations being aligned and secured together to form a compact block 17 whose lower portion is secured in a cutout 18 formed in a base 19 of the frame 11 as by screws 20. The laminations are shaped to provide the block 17 with a plurality of pole pieces 21–28 inclusive having the shape shown. Referring specifically to the pole piece 21, it being appreciated that each of the other poles is identical thereto, there is provided a winding 21a circumscribing the reduced intermediate portion of the pole piece in a manner which upon the energization of the winding causes the pole piece to be magnetized. The pole piece 21 is further provided with a surface 21b on which there are formed teeth 21c. The other poles 22–28 similarly have windings 22a through 28a inclusive, surfaces 22b–28b and teeth 22c–28c respectively. With this construction of the stator means it will accordingly be appreciated that each pole piece may have its teeth magnetized with either an N or an S magnetic polarity and that the other polarity is achieved by simply reversing the unidirectional current flow through the winding.

The second stator means 14 is identical in construction to the first except for the difference hereinafter pointed out and thus includes laminations 29 formed from thin sheets of magnetic iron having the shape shown which are aligned and secured together to form a block 30 which fits and is fastened in a cutout 31 formed in a slider 32, as by screws 33, the slider being of non-magnetic material as is the base 19. Stator means 14 further includes poles 34–41 inclusive, each of which is provided with windings 34a–41a inclusive, surfaces 34b–41b and teeth 34c–41c. As in the first stator means 12 energization of the windings 34a–41a may effect either an N or an S magnetic polarity of the teeth of its respective pole piece.

As shown in FIG. 2, a plurality of uprights 42 (formed of non-magnetic material) are positioned and secured on both sides of the base 19 and the uprights each carries a plurality of ball bearings indicated by the reference numeral 43. Some of the ball bearings 43 support the first plunger and second stator means by the slider 32 being formed with grooves 44 in which the ball bearings are operable and thus only permit the slider 32 to move in either direction in a linear path, generally indicated by the arrow 45. In addition, the plunger 15 is also supported for reciprocating movement with respect to the base 19 by other ball bearings 43 operating in grooves 46 formed in end members 47 of the plunger 15, the end members being of non-magnetic material. The grooves 44 and 46 are all parallel and thus the plunger 15 may only move linearly in the direction indicated by the arrow 48 and this direction is parallel to the movement indicated by the arrow 45.

Referring specifically to FIGS. 2 and 3, the first plunger 13 includes longitudinally extending members 49 and 50 formed of magnetic material which are positioned at the sides of an elongate, longitudinally extending permanent magnet 51. Each of the members 49 and 50 has a surface opposite and adjacent the surfaces 21b–28b with the member surfaces each being formed with equally spaced teeth 49a and 50a substantially throughout the length of the members. The teeth are all identical and have a constant tooth pitch (herein referred to as the plunger tooth pitch) with, as shown in FIG. 3, the teeth 50a being displaced ½ a plunger tooth pitch from the teeth 49a along the path of movement of the plunger 15. The magnet 51 is polarized transverse to its length as indicated with its poles being indicated by the letters N and S and each of the members 49 and 50 is placed against a pole to be magnetized thereby. The members 49 and 50 together with magnet 51 may be secured to the slider 32 in the above-described relationship in any desired manner.

The plunger 15 is similar in construction to the plunger 13 and thus includes longitudinally extending members 52 and 53 together with a permanent magnet 54 positioned therebetween. The members 52 and 53 are formed to provide teeth 52a and 53a respectively extending transversely thereof with each tooth having a constant tooth pitch (herein called the plunger tooth pitch) and with the teeth 52a being longitudinally displaced from the teeth 53a, ½ a tooth pitch along the line of movement of the plunger 15. The plunger 15 may be formed into a unitary piece by securing together the end members 47, members 52 and 53 and magnet 54 in the relationship heretofore described in any desired manner.

In the operation of the motor 10, the pole pieces of the stator means 12 and 14 may be magnetized in the following manner by their respective winding to cause the plungers 13 and 15 to move ¼ of their tooth pitch for each step rightwardly in FIG. 1. The additive table effects movement of both plungers in the same direction (rightwardly) while the differential table provides for movement in opposite directions by the plunger 13 moving rightwardly and the plunger 15 moving leftwardly. Thus the additive table will provide an incremental step movement which is the sum of the lengths of the steps of the plungers while the differential will be the difference in the length of the steps therebetween.

| Pole Piece | 21 | 22 | 23 | 24 | 25 | 26 | 27 | 28 | Additive | | | | | | | |
| --- | --- | --- | --- | --- | --- | --- | --- | --- | --- | --- | --- | --- | --- | --- | --- | --- |
| | | | | | | | | | 34 | 35 | 36 | 37 | 38 | 39 | 40 | 41 |
| 1st | N | N | S | S | N | N | S | S | N | N | S | S | N | N | S | S |
| 2nd | S | N | N | S | S | N | N | S | S | N | N | S | S | N | N | S |
| 3rd | S | S | N | N | S | S | N | N | S | S | N | N | S | S | N | N |
| 4th | N | S | S | N | N | S | S | N | N | S | S | N | N | S | S | N |
| 1st | N | N | S | S | N | N | S | S | N | N | S | S | N | N | S | S |

| Pole Piece | 21 | 22 | 23 | 24 | 25 | 26 | 27 | 28 | Differential | | | | | | | |
| --- | --- | --- | --- | --- | --- | --- | --- | --- | --- | --- | --- | --- | --- | --- | --- | --- |
| | | | | | | | | | 34 | 35 | 36 | 37 | 38 | 39 | 40 | 41 |
| 1st | N | N | S | S | N | N | S | S | N | N | S | S | N | N | S | S |
| 2nd | S | N | N | S | S | N | N | S | N | S | S | N | N | S | S | N |
| 3rd | S | S | N | N | S | S | N | N | S | N | N | S | S | N | N | S |
| 4th | N | S | S | N | N | S | S | N | S | S | N | N | S | S | N | N |
| 1st | N | N | S | S | N | N | S | S | N | N | S | S | N | N | S | S |

Referring specifically to the stator means 12 and plunger 13, it will be understood that for the first step, teeth 21d and 49b and 22d and 49c will tend to and become substantially aligned by reason of the teeth 49b and 49c being magnetized S and teeth 21d and 22d magnetized N. In addition teeth 23d and 49d and 24d and 49e tend to and become almost ½ a plunger tooth pitch out of alignment by reason of the repulsion due to like magnetic polarities and because of the ¼ plunger tooth pitch differential between pole pieces. The second step causes poles 22 and 23 to become N poles substantially aligning teeth 22d and 49c and 23d and 49d producing a ¼ tooth pitch movement of the plunger 15 rightwardly. Subsequently in the third step poles 23 and 24 become N causing teeth 23d and 49d and 24d and 49e to become substantially aligned and produce another ¼ plunger tooth pitch incremental step. The fourth step substantially aligns teeth 24d and 49e and 25d and 49f again producing a ¼ tooth pitch of the plunger. With the repetition of the condition represented by the first step tooth 49g will become substantially aligned with tooth 21d and the plunger has thus moved a distance equal to the tooth pitch of the plunger teeth 49 in ¼ pitch steps.

It will be appreciated that the stator means 14 and plunger 15 function in the same manner and that each change in energization effects the movement of the plunger 15, ¼ of the tooth pitch of the plunger 15. Moreover, by reversing the sequence of energization of the windings the plunger may be moved in the reverse direction as indicated by the difference between the attitive and differential sequences of energization of the stator means 14.

In both stator means of the motor disclosed herein, the pole pieces are each differentially displaced from each other a distance equal to ¼ of a tooth pitch of its associated plunger. This is accomplished preferably in the manner shown by providing in the same length a different number of stator teeth as compared to plunger teeth with the pitch of the plunger and stator teeth being different. Thus in the embodiment shown there are 25 plunger teeth in the same length that 24 stator teeth would occupy and thus by having the stator poles identical with a similar distance therebetween, the differential displacement between the pole pieces with respect to its associated plunger tooth pitch is automatically achieved. Though, if desired, the pitch of the stator and plunger teeth may be the same with each pole piece being displaced ¼ of a tooth pitch from an adjacent pole piece.

The tooth pitch of the teeth 52a and 53a of the plunger 15 is the same as is the tooth pitch of teeth 49a and 50a of the plunger 13. However, in order to provide a differential movement between the two plungers the present invention provides for the tooth pitch of the plunger 15 to be slightly different from the tooth pitch of the plunger 13. Thus for example the tooth pitch of the former may be .096 inch while the tooth pitch of the latter may be .120 inch. Thus a movement may be achieved from the plunger 15 with respect to the frame 11 which is the difference between ¼ of the tooth pitch of the plunger 13, namely .030 inch less ¼ tooth pitch movement. 024 inch of the plunger 15, giving a differential of .006 inch for the plunger 15 with respect to the frame 11. If, of course, they both move in the same direction then the movement of the plunger 15 would be .054 inch. While the movement of the plunger above described relates to moving the plunger for each change of magnetization of the pole pieces a distance equal to ¼ of their respective tooth pitches, it will be appreciated that with the present construction if the pole pieces are magnetized according to the following table that the plunger may be caused to move ⅛ of a tooth pitch for each change of energization. In the table the lack of energization of a winding is indicated by a dash.

of course will provide for additional movements of .009 and .018 for a differential movement and .039 and .042 for an additive movement. Naturally, only one plunger may be moved, the other being held stationary which would provide two more lengths of movement for ¼ tooth pitch steps and an additional two for ⅛ tooth pitch steps.

It of course will be understood that the above lengths and dimensions are to be considered as merely illustrative of one specific embodiment of the invention and that any desired tooth pitch of the plungers 13 and 15 may be employed providing they are different.

Referring to FIG. 4, there is shown a schematic diagram of a control circuit which may be employed to provide the magnetization required for the movement of the plunger above described. While the windings may be energized by appropriate automatic circuitry, in the present disclosed embodiment manual switches are employed. Thus windings 21a and 25a and windings 22a and 26a, 23a and 27a, 24a and 28a are connected in parallel to switch arms 55 and 56, 57 and 58, 59 and 60 and 61 and 62 respectively. It will be understood that in the present embodiment while eight pole pieces are shown the second set, i.e. 25 through 28 are merely duplicates of the first set 21 through 24 inclusive and thus the duplicates are energized at the same time and of the same polarity as their original pole pieces 21–24 inclusive and thus could be series or parallel connected. Moreover, while eight have been shown it will be appreciated that a greater or lesser number in multiples of four may be employed by reason of the motor functioning in ¼ tooth pitch incremental steps.

The stator means 14 similarly has windings 34a and 38a, 35a and 39a, 36a and 40a and 37a and 41a connected in parallel and to switch arms 63 and 64, 65 and 66, 67 and 68, 69 and 70 respectively. As pointed out in connection with the stator means 12, the pole pieces 38 through 41 are merely duplicates of the pole pieces 34–

| Pole Piece | 21 | 22 | 23 | 24 | 25 | 26 | 27 | 28 | Additive | | | | | | | |
|---|---|---|---|---|---|---|---|---|---|---|---|---|---|---|---|---|
| | | | | | | | | | 34 | 35 | 36 | 37 | 38 | 39 | 40 | 41 |
| 1st | N | N | S | S | N | N | S | S | N | N | S | S | N | N | S | S |
| 2nd | --- | N | --- | S | --- | N | --- | S | --- | N | --- | S | --- | N | --- | S |
| 3rd | S | N | N | S | S | N | N | S | S | N | N | S | S | N | N | S |
| 4th | S | --- | N | --- | S | --- | N | --- | S | --- | N | --- | S | --- | N | --- |
| 5th | S | S | N | N | S | S | N | N | S | S | N | N | S | S | N | N |
| 6th | --- | S | --- | N | --- | S | --- | N | --- | S | --- | N | --- | S | --- | N |
| 7th | N | S | S | N | N | S | S | N | N | S | S | N | N | S | S | N |
| 8th | N | --- | S | --- | N | --- | S | --- | N | --- | S | --- | N | --- | S | --- |
| 1st | N | N | S | S | N | N | S | S | N | N | S | S | N | N | S | S |

| Pole Piece | 21 | 22 | 23 | 24 | 25 | 26 | 27 | 28 | Differential | | | | | | | |
|---|---|---|---|---|---|---|---|---|---|---|---|---|---|---|---|---|
| | | | | | | | | | 34 | 35 | 36 | 37 | 38 | 39 | 40 | 41 |
| 1st | N | N | S | S | N | N | S | S | N | N | S | S | N | N | S | S |
| 2nd | --- | N | --- | S | --- | N | --- | S | N | --- | S | --- | N | --- | S | --- |
| 3rd | S | N | N | S | S | N | N | S | N | S | S | N | N | S | S | N |
| 4th | S | --- | N | --- | S | --- | N | --- | --- | S | --- | N | --- | S | --- | N |
| 5th | S | S | N | N | S | S | N | N | S | S | N | N | S | S | N | N |
| 6th | --- | S | --- | N | --- | S | --- | N | S | --- | N | --- | S | --- | N | --- |
| 7th | N | S | S | N | N | S | S | N | N | S | S | N | N | S | S | N |
| 8th | N | --- | S | --- | N | --- | S | --- | N | --- | S | --- | N | --- | S | --- |
| 1st | N | N | S | S | N | N | S | S | N | N | S | S | N | N | S | S |

By causing each of the plungers 13 and 15 to be moved according to the ⅛ tooth pitch step table, with the same tooth pitches of .120 and .096 steps may produce movements of .015 and .012 inch for the plunger 13 and 15 respectively. Thus if the stator means is magnetized according to the ⅛ tooth pitch step differential table, then the movement of the plunger 15 with respect to the frame 11 will be .003 inch while if the additive table is employed it would be .027 inch. Moreover, if desired, one of the plungers may be stepped according to the table for moving it ¼ of a tooth pitch per step while the other is energized according to the ⅛ tooth pitch step. This 37 and again a greater or lesser number of pole pieces may be employed if so desired.

Each of the switch arms is operable to be in engagement with three contacts a, b or c with the contacts a being connected to the plus side 71 of a source of electrical energy and the contacts c to the negative side 72 with the intermediate contacts b each being an open contact. Thus whenever it is desired to energize the windings 21a and 25a for example to have the pole piece 21 be polarized N, the switch arms 55 and 56 are thrown to contact the contacts a and c respectively while if it is desired to magnetize pole pieces 21 S, then the switch arms are thrown to be in engagement with contacts *c* and *a* respectively. In this manner each of the other windings may be energized by the proper positioning of the switch arms. Also for providing a lack of magnetization of a pole piece the switch arms associated with the pole piece may be placed to engage the contact *b*. The two switch arms associated with each pair of windings are shown mechanically interconnected by a dotted line for movement together and it will be understood that if desired this may be eliminated and that other connections may be made to cause movement of a plurality of switch arms simultaneously. This at times may be found to be desirable if movement of the plungers 13 and 15 simultaneously is preferred.

In the above-described embodiment it will be understood that if desired a magnetizing coil may be substituted for each of the permanent magnets in the plunger. It will additionally be appreciated that the plungers are braked or held maintained in position when the winding energization is maintained. As used herein, it will be clear that the term change in energization of a winding for a pole piece includes not only a change from one magnetic polarity of the pole piece to the other but also a change from a condition of non-magnetism to magnetism or vice versa of the pole piece by the winding means.

It will accordingly be appreciated that there has been disclosed a linear electric motor which produces small incremental movements but yet the motor is constructed within practical mechanical and magnetic design factors. This is achieved by the use of a first stator means and plunger and a second stator means and plunger with each plunger being mounted for linear movement in incremental steps with respect to its stator means. By providing toothed surfaces on both the plunger and stator means, the length of the incremental movement of each plunger is thus a fraction of the tooth pitch of its teeth. Moreover, in accordance with the present invention the tooth pitch of one plunger is slightly different from the tooth pitch of the other plunger and thus by having the two plungers move in opposite directions the total movement constituting the output of the motor is the difference of movement therebetween.

Variations and modifications may be made within the scope of the claims and portions of the improvements may be used without others.

I claim:

1. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means, second stator means including at least two adjacent second pole pieces, second winding means which upon energization magnetizes said second pole pieces, a second plunger mounted on said frame for linear movement relative to said second stator means, means mounting either the second stator means or second plunger on the first plunger for movement therewith whereby said linear movements are parallel, and control means for changing the energization of both winding means to change the magnetization of at least one pole piece to produce a linear movement of the second plunger with respect to the frame.

2. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means, second stator means mounted on said first plunger for movement therewith and including at least two adjacent second pole pieces, second winding means which upon energization magnetizes said second pole pieces, a second plunger mounted on said frame for linear movement relative to said second stator means, said linear movements being in parallel paths, and control means for changing the energization of both winding means to produce a linear movement of the second plunger which is the algebraic sum of the movements of the first and second plungers.

3. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means, second stator means mounted on said first plunger for movement therewith and including at least two adjacent second pole pieces, second winding means which upon energization magnetizes said second pole pieces, a second plunger mounted on said frame for linear movement relative to said second stator means, said linear movements being in parallel paths, and control means for changing the energization of both winding means to produce a linear movement of the second plunger in one direction and the first plunger in the other direction whereby the difference of the movements of the first and second plungers constitutes the output movement of the motor.

4. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means, second stator means mounted on said first plunger for movement therewith and including at least two adjacent second pole pieces, second winding means which upon energization magnetizes said second pole pieces, a second plunger mounted on said frame for linear movement relative to said second stator means, said linear movements being in parallel paths, each of said plungers having a surface formed with teeth extending transversely to its path of movement and having a constant tooth pitch with the tooth pitch of the first plunger being different from the second plunger, and control means for changing the energization of both winding means to produce a linear movement of the second plunger in one direction which is a fraction of its tooth pitch and a linear movement of the first plunger in the opposite direction which is a fraction of its tooth pitch whereby the difference of the two movements of the first and second plungers is the output movement of the motor.

5. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means, second stator means mounted on said first plunger for movement therewith and including at least two adjacent second pole pieces, second winding means which upon energization magnetizes said second pole pieces, a second plunger mounted on said frame for linear movement relative to said second stator means, said linear movements being in parallel paths, each of said plungers having a surface formed with teeth extending transversely to its path of movement and having a constant tooth pitch with the tooth pitch of the first plunger being different from the second plunger, and control means for changing the energization of both winding means to produce a linear movement of the second plunger which is a fraction of its tooth pitch and a linear movement of the first plunger which is a fraction of its tooth pitch, said fractions being different whereby the difference of the two movements of the first and second plungers is the output movement of the motor.

6. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means, second stator means mounted on said first plunger for movement therewith and including at least two adjacent second pole pieces, second winding means which upon energization magnetizes said second pole pieces, a second plunger mounted on said frame for linear movement relative to said second stator means, said linear movements being in parallel paths, each of said plungers having a surface formed with teeth extending transversely to its path of movement and having a constant tooth pitch with the tooth pitch of the first plunger being different from the second plunger, and control means for changing the energization of both winding means to produce a linear movement of the second plunger in one direction which is a fraction of its tooth pitch and a linear movement of the first plunger in the opposite direction which is a fraction of its tooth pitch, said fractions being different whereby the difference of the two movements of the first and second plungers is the output movement of the motor.

7. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means, second stator means mounted on said first plunger for movement therewith and including at least two adjacent second pole pieces, second winding means which upon energization magnetizes said second pole pieces, a second plunger mounted on said frame for linear movement relative to said second stator means, said linear movements being in parallel paths, each of said plungers having a surface formed with teeth extending transversely to its path of movement and having a constant tooth pitch with the tooth pitch of the first plunger being different from the second plunger, and control means for changing the energization of one of the winding means while maintaining the other to produce a linear movement of one of the plungers which is a fraction of its tooth pitch and maintaining the other plunger stationary with respect to its stator means whereby the movement of the one plunger is the output movement of the motor.

8. A linear electric motor for providing incremental linear movement comprising a frame, first stator means mounted on said frame and including at least two adjacent pole pieces, winding means which upon energization magnetizes said pole pieces, a first plunger mounted on said frame for movement relative to said first stator means along a linear path, second stator means mounted on said first plunger for movement therewith and including at least two adjacent second pole pieces, second winding means which upon energization magnetizes said second pole pieces, a second plunger mounted on said frame for movement relative to said second stator means along a linear path, said linear paths being parallel, each of said plungers having a surface formed with teeth extending transversely to its path of movement and having a constant tooth pitch with the tooth pitch of the first plunger being different from the second plunger, the said pole pieces of each stator means having a surface paralleling said path and having equally spaced teeth formed in said surface, said pole pieces of each stator means being differentially disposed along its path a fraction of the tooth pitch of its plunger, and control means for changing the energization of the winding means to produce a linear movement of the second plunger which is a fraction of its tooth pitch and a linear movement of the first plunger which is a fraction of its tooth pitch whereby the algebraic sum of the two movements of the first and second plungers is the output movement of the motor.

9. A linear electric motor for providing incremental linear movement comprising a frame, first stator means mounted on said frame and including at least two adjacent pole pieces, winding means which upon energization magnetizes said pole pieces, a first plunger mounted on said frame for linear movement relative to said first stator means along a linear path, second stator means mounted on said first plunger for movement therewith and including at least two adjacent second pole pieces, second winding means which upon energization magnetizes said second pole pieces, a second plunger mounted on said frame for linear movement relative to said second stator means along a linear path, said linear paths being parallel, each of said plungers having a surface formed with teeth extending transversely to its path of movement and having a constant tooth pitch with the tooth pitch of the first plunger being different from the second plunger, each of said plungers being elongate and having a permanent magnet polarized transversely with an end member extending along each side of the magnet, said teeth being formed in said end members with the teeth of one end member being longitudinally displaced one half a plunger tooth pitch from the other end member, said pole pieces of each stator means having a surface paralleling said path and having equally spaced teeth formed in said surface, said pole pieces of each stator means being differentiallly disposed along its path a fraction of the tooth pitch of its plunger, and control means for changing the energization of the winding means to produce a linear movement of the second plunger which is a fraction of its tooth pitch and a linear movement of the first plunger which is a fraction of its tooth pitch whereby the algebraic sum of the two movements of the first and second plungers is the output movement of the motor.

References Cited by the Examiner

UNITED STATES PATENTS 3,162,796   12/1964   Schreiber et al. ____ 310—12 XR

OTHER REFERENCES

IBM Technical Disclosure Bulletin, vol. 6, No. 9, February 1964.

MILTON O. HIRSHFIELD, *Primary Examiner.*

D. F. DUGGAN, *Assistant Examiner.*